Feb. 4, 1958 J. O. PUNDERSON 2,822,399
MANUFACTURE OF DIKETONES
Filed May 1, 1953
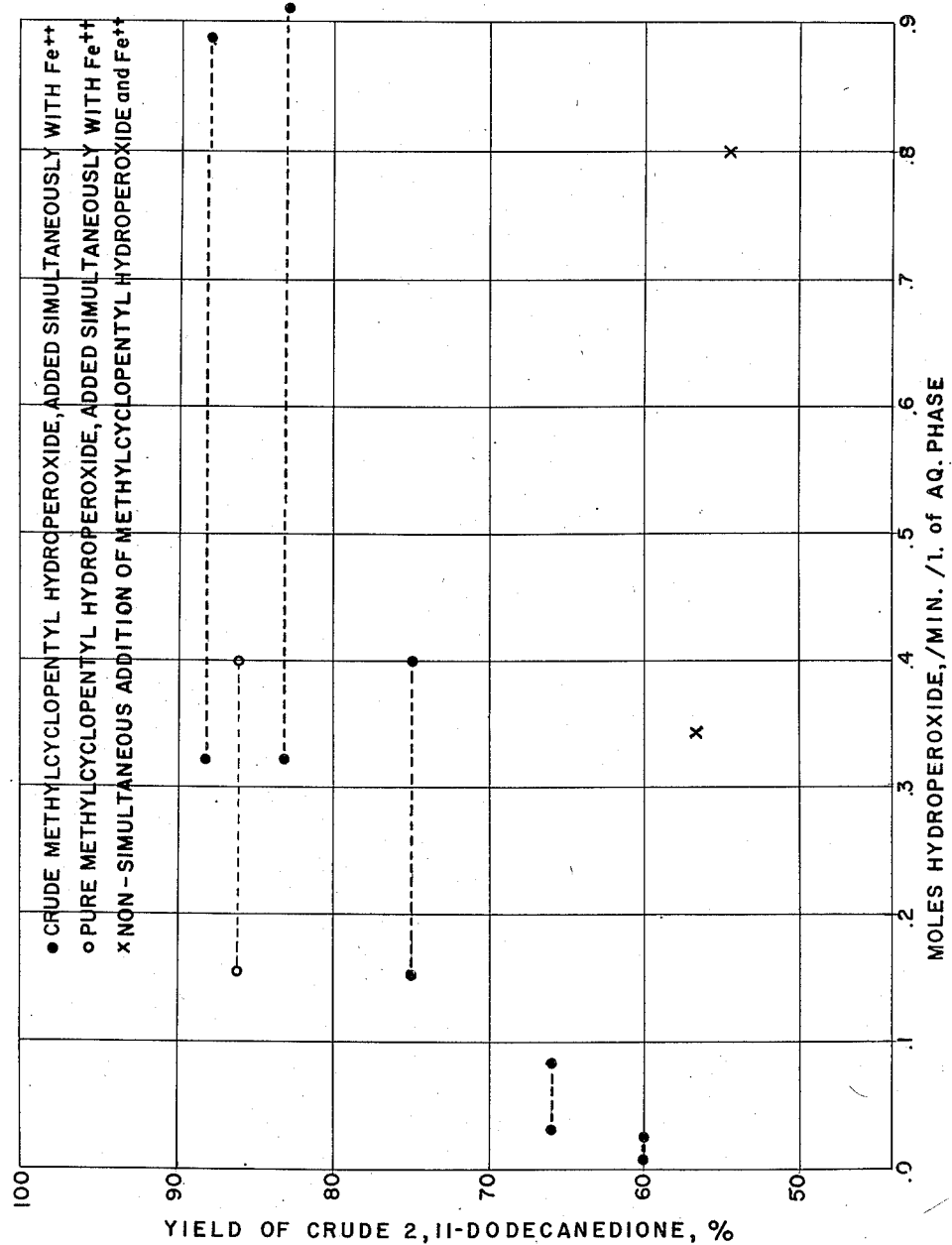
INVENTOR
JOHN O. PUNDERSON
BY
ATTORNEY United States Patent Office 2,822,399
Patented Feb. 4, 1958

2,822,399

MANUFACTURE OF DIKETONES

John O. Punderson, Wilmington, Del., assignor to E. I. du Pont de Nemours and Company, Wilmington, Del., a corporation of Delaware Application May 1, 1953, Serial No. 352,487

3 Claims. (Cl. 260—593)

This invention relates to improvements in processes for making long chain diketones by reductive coupling of methylcycloalkyl hydroperoxides, especially methylcyclopentyl hydroperoxide.

It has been reported heretofore that methylcyclopentyl hydroperoxide, upon reaction with a solution of ferrous salt in the presence of water, gives a diketone, namely, 2,11-dodecanedione. The yield of diketone thus obtained is quite low (8.5%) when the reaction is carried out for 3 hours at about 100° C., but is considerably better (44%) when the reactants are mixed at room temperature.

An object of this invention is to provide further improvements in the manufacture of 2,11-dodecanedione from methylcyclopentyl hydroperoxide. Other objects of the invention will appear hereinafter.

It has been discovered in accordance with this invention that greatly improved yields of 2,11-dodecanedione from methylcyclopentyl hydroperoxide are obtained by avoiding any substantial accumulation of ferrous ion or hydroperoxide in the reaction mixture during the early stages of the reaction. When the reactants are introduced in the conventional manner there is initially a high concentration of either the hydroperoxide reactant or the ferrous ion reactant, and the concentration of the excess reactant decreases as the reaction proceeds. If, in contrast with this, the ferrous ion and hydroperoxide are introduced separately and simultaneously at substantially the same rate, which rate is not faster than the rate of reaction, the yield of 2,11-dodecanedione is very greatly enhanced.

The reason for the phenomenon just described is not fully understood, but in all probability it is partly due to reduction of the methylcyclopentoxy free radical to undesirable products by an excess of ferrous ion. Whatever the theoretical explanation, the fact of the matter is that a very marked enhancement of yield occurs when the reactants are introduced in such manner that accumulation of $Fe^{++}$ in the mixture is kept at a minimum, e. g. by introducing the hydroperoxide and ferrous ion simultaneously and in substantially equivalent amounts, so that the accumulation of ferrous ion is avoided or held at the lowest practical level. Likewise, an accumulation of excess hydroperoxide, which results in decreased yield (evidently because of a side-reaction involving free-radical induced decomposition of the hydroperoxide) is avoided by separate introduction of hydroperoxide in the same rate, on a mol basis, as the rate of introduction of ferrous ion. Surprisingly, this rate must be kept above a minimum level, for optimum results. If the rate of introduction of the reactants is too slow, interfering influences, other than those just mentioned, come into play, and this produces greatly decreased yields of diketone. The invention thus involves the discovery that yields of diketone can be virtually doubled by separate and simultaneous introduction of the reactants, each reactant being introduced at the rate of at least 0.05 mol per minute per liter of aqueous phase for yields in excess of 65%, and at the rate of about 0.2 to 1.0 mol per minute per liter of aqueous phase for yields of about 75% to 90% or higher. The reaction temperature is critical in the sense that it must be held below the level at which thermal decomposition of the peroxide is an appreciable yield-affecting factor. At temperatures above about 130° C., the thermal decomposition reaction takes precedence over the coupling reaction. At temperatures up to about 70° C., loss of the peroxide by the thermal decomposition route is too slow to have any substantial effect on yield of diketone. The coupling reaction is itself not sensitive to temperature and takes place readily at temperatures as low as the freezing point of the mixture. Refrigeration is, however, not necessary, and therefore the preferred range of temperature, from the standpoint of all of these considerations is from 20° C. to 70° C.

The rate of introduction of reactants (in terms of mols per minute per liter of aqueous phase) need not be kept constant. In fact, if the rate in terms of mols per minute is constant (cf. the illustrative examples) the rate in terms of mols per minute per liter of aqueous phase decreases as the volume of aqueous phase gets larger. Under these circumstances, a range of rates, rather than a single rate, is reported herein. Where a range of rates is given, it appears that the yield decreases as the reaction progresses, and that the ultimate overall yield is a mean between the initial optimum yield and the relatively lower yield produced from the last portions of reactants charged.

It is to be understood that after the diketone-formation is substantially complete there is no reason why further quantities of ferrous ion cannot be added, although the introduction of such an excess after the main reaction is completed is not particularly helpful.

In the examples which follow it is apparent that the rate of simultaneous and separate addition of the reactants is critically important in obtaining optimum yields. Thus, in Example 1, 0.081 mol of hydroperoxide was introduced in 2 minutes, together with an equal number of mols of $Fe^{++}$, while the total volume of aqueous phase in the reaction mixture was within the range of 100 to 262 ml. during this period. The rate of introducing hydroperoxide was thus within the range of about 0.40 to 0.15 mole per minute per liter of aqueous phase. In Example 3 the corresponding rate was 0.081 to 0.031 mol per minute per liter of aqueous phase, and the yield dropped to 66%. In Example 4 the rate was lowered to 0.027 to 0.010, and the yield dropped to 60%. Corresponding runs in which the reactants were not introduced simultaneously, gave yields less than 60%. This was true when the hydroperoxide was added to the ferrous solution (Examples 5 and 7) or when the reverse order of addition was used (Example 6). In Example 8 the rate was 0.89 to 0.32, the yield was 87.5%. These results are set forth graphically in the accompanying drawing.

The maximum rate of separate introduction of reactants is limited only by the inherent rate of reaction at the temperatures prevailing, and also by practical engineering considerations. The inherent reaction rate is very rapid at the preferred temperatures of 20° to 70° C. The upper limit of 1 mol per minute per liter of aqueous phase can thus be exceeded if special precautions are taken to provide exceptionally good mixing at the point of contact of the merging streams of reactants.

The reaction can conveniently be carried out in batch equipment or in a continuous reactor. In batchwise operation it is practical to vary the input flow in proportion to the volume of accumulated mixture, so that the rate is close to optimum throughout all or nearly all of the entire reaction period. On the other hand, in continuous operations the input flow should be held relatively constant, since in this manner the optimum ratio can be maintained and the optimum yield readily achieved in a rather simple manner.

The invention is illustrated further by means of the following examples:

*Example 1.*—A liter 3-necked creased flask was equipped with a stirrer and two large calibrated dropping burettes. One hundred milliliters of water was placed in the flask and stirred while the flask was swept with a slow stream of nitrogen. Five hundred ml. of air-oxidized methylcyclopentane containing 0.081 mol of hydroperoxide calculated as 1-methylcyclopentyl hydroperoxide was added to the flask over a period of two minutes. Simultaneously, 162 ml. of an aqueous solution 0.5 molar in ferrous sulfate and 1.0 molar in sulfuric acid was added to the stirred mixture so that the molar ratio of hydroperoxide added to ferrous ion added was 1:1 during the entire two minute period. The hydroperoxide addition was then complete, but the ferrous solution addition was continued until a 25% excess had been added.

The temperature of the reaction mixture rose from 24.5° C. at the start of the addition to 34.5° after two minutes. It reached a maximum of 35.3° C. after 2¾ minutes and then started to drop off. This indicates that the major part of the reaction takes place during the two minute addition period.

After about 15 minutes' stirring, the mixture was allowed to separate into two layers, and the hydrocarbon layer was washed with a small quantity of aqueous sodium carbonate. Distillation of this layer gave methylcyclopentane, a small amount of by-product boiling below 94° C. at 23 mm., and a residue of 6.02 grams (75% of theoretical yield) of crude, crystalline 2,11-dodecanedione.

*Example 2.*—The procedure of Example 1 was repeated using a solution of pure 1-methylcyclopentyl hydroperoxide in methylcyclopentane instead of air-oxidized methylcyclopentane. The yield of crude, crystalline 2,11-dodecanedione was 86% of the theoretical.

*Example 3.*—Example 1 was repeated except that the simultaneous addition of the reactant solutions took place over a period of ten minutes. The yield of crude, crystalline 2,11-dodecanedione was 66% of the theoretical.

*Example 4.*—Example 1 was repeated except that the simultaneous addition of the reactant solutions took place over a period of thirty minutes. The yield of 2,11-dodecanedione was 60% of the theoretical.

*Example 5.*—A quantity of air-oxidized methylcyclopentane similar to that of Example 1 was added over a period of about one-half minute to a stirred aqueous solution 0.5 molar in ferrous sulfate and 1.0 molar in sulfuric acid. A 25% molar excess of ferrous ion was used based on hydroperoxide analysis of the hydrocarbon oxidate. The addition of the reactant solutions to the vessel was not simultaneous, and the yield of 2,11-dodecanedione was 55% of the theoretical.

*Example 6.*—Example 5 was repeated except that the ferrous solution was added to the hydroperoxide solution instead of vice versa. The yield of 2,11-dodecanedione was 53% of the theoretical.

*Example 7.*—A solution of 30 grams of ferrous sulfate heptahydrate and 12 ml. of concentrated sulfuric acid in 200 ml. of water was stirred at 32° C. while 322 ml. of air-oxidized methylcyclopentane containing 0.084 mol of hydroperoxide (calculated as 1-methylcyclopentyl hydroperoxide) was added over a period of one minute. The temperature rose quickly to a maximum of 39.8° C. and then started to drop off. The reaction mixture was worked up as in Example 1 and gave 57% yield of crude, crystalline 2,11-dodecanedione.

*Example 8.*—A procedure similar to Example 1 was followed using 500 ml. of air-oxidized methylcyclopentane containing 0.089 mol of hydroperoxide. Simultaneously, 178 ml. of aqueous solution 0.5 molar in ferrous sulfate and 1.0 molar in sulfuric acid was added over a period of one minute. The yield of crude, crystalline, 2,11-dodecandedione was 87.5%.

The use of sulfuric acid or other mineral acid to assist in keeping the ferrous iron in solution, i. e. avoid precipitate formation, is not absolutely essential, and the reaction takes place quite well even when such acid is not added. It is usually desirable to employ enough sulfuric acid to keep all of the iron in solution. The use of organic diluents is also optional; transfer of the diketone from the aqueous phase (where the coupling reaction takes place) to the nonaqueous phase, occurs without any added organic solvent.

While in the foregoing examples sweeping out the reaction vessel with nitrogen was illustrated as a precautionary measure, such a step is not an essential or indispensable one, especially in large scale commercial continuous equipment, in which exposure to oxygen need not occur.

The concentration of reactants can be varied over a wide range, but of course it is economical to employ as little solvent as may be practicable in handling, transfer, etc., of the reactants. The hydroperoxide can be used without diluent. From the practical standpoint, a crude condensate produced by methylcyclopentane oxidation in the known manner is preferable, and the comparative results herein reported were obtained with such crude concentrates.

The process of the invention is highly useful and practical as a step in the manufacture of nylon intermediates, especially 2,11-dodecanediamine, which can be produced from 2,11-dodecanedione by reductive amination.

I claim:

1. In a process for manufacturing 2,11-dodecanedione the step which comprises introducing, separately and simultaneously, into a reaction zone (1) an aqueous solution containing ferrous ion, and (2) methylcyclopentyl hydroperoxide, while maintaining the introduction of methylcyclopentyl hydroperoxide at the rate of at least 0.05 mol per minute per liter of aqueous phase in the reaction mixture, maintaining the rate of introduction of ferrous iron equivalent to the rate of introduction of methylcyclopentyl hydroperoxide throughout the reaction period, maintaining the temperature of reacting mixture within the range of 20° to 70° C., and thereafter separating 2,11-dodecanedione from the resulting products.

2. Process of claim 1 wherein the said rate is from 0.2 to 1.0, and the yield of 2,11-dodecanedione is at least 75%.

3. Process of claim 2 wherein the aqueous phase contains enough sulfuric acid to keep all of the iron in solution.

References Cited in the file of this patent

UNITED STATES PATENTS

| | | |
|---|---|---|
| 2,469,916 | Carter | May 10, 1949 |
| 2,575,014 | Hawkins et al. | Nov. 13, 1951 |
| 2,626,281 | Joris | Jan. 20, 1953 |
| 2,671,810 | Coffman et al. | Mar. 9, 1954 |

OTHER REFERENCES

Hawkins et al.: Jour. Chem. Soc., 1950, pp. 2804–2808.